United States Patent
Wadsworth (10) Patent No.: US 11,981,415 B2
(45) Date of Patent: May 14, 2024

(54) BULB STIFFENER WITH SINUSOIDAL WEB

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/973,037

(22) Filed: Oct. 25, 2022

(65) Prior Publication Data
US 2023/0038291 A1 Feb. 9, 2023

Related U.S. Application Data (62) Division of application No. 16/690,445, filed on Nov. 21, 2019, now Pat. No. 11,505,301.

(51) Int. Cl.
| | |
|---|---|
| *B29C 70/34* | (2006.01) |
| *B64C 1/06* | (2006.01) |
| *B64C 3/18* | (2006.01) |
| *B64F 5/10* | (2017.01) |

(Continued)

(52) U.S. Cl.
CPC ............ *B64C 1/064* (2013.01); *B29C 70/345* (2013.01); *B64C 3/182* (2013.01); *B64F 5/10* (2017.01); *B29L 2031/003* (2013.01); *B64C 2001/0072* (2013.01)

(58) Field of Classification Search
CPC ...... B29C 70/462; B29C 70/34; B29C 70/345
See application file for complete search history.

(56) References Cited

U.S. PATENT DOCUMENTS

| | | | |
|---|---|---|---|
| 6,520,706 B1 * | 2/2003 | McKague, Jr. | B29C 70/64 |
| | | | 156/182 |
| 6,841,021 B1 * | 1/2005 | Mesing | B29C 70/345 |
| | | | 264/261 |
| 7,818,945 B2 | 10/2010 | Gregg et al. | |

(Continued)

OTHER PUBLICATIONS

Yovanof, N.P., D.C. Jegley, Compressive Behavior of Frame-Stiffened Composite Panels, 52nd AIAA/ASME/ASCE/AHS/ASC Structures, Structural Dynamics and Materials Conference (2011), 15 pages. (Year: 2011).*

(Continued)

*Primary Examiner* — Matthew J Daniels
(74) *Attorney, Agent, or Firm* — Stinson LLP (57) ABSTRACT

An improved composite stiffener and methods and tooling used to form the same. The stiffener includes one or more base flanges, a composite rod extending in an axial direction, a bulb cap surrounding the composite rod, and an upright web extending from the one or more base flanges to the base cap. The upright web includes a non-linear profile in the axial direction providing the improved lateral stiffness. The method includes providing tooling including a first compression tool extending in the axial direction and including a first web portion having a non-linear profile, and a second compression tool extending in the axial direction and including a second web portion having a non-linear profile. Plies are placed within the tooling and compressed such that at least a portion of plurality of plies are compressed in the web forming portion thereby forming a web of the bulb stiffener having a non-linear profile.

11 Claims, 11 Drawing Sheets

(51) Int. Cl.
   *B29L 31/00*     (2006.01)
   *B64C 1/00*      (2006.01)

(56) References Cited

U.S. PATENT DOCUMENTS

| | | |
|---|---|---|
| 8,042,767 B2 | 10/2011 | Velicki et al. |
| 9,463,880 B2 * | 10/2016 | Vetter .................. B29C 70/081 |
| 2011/0039057 A1 | 2/2011 | Frisch et al. |
| 2014/0203477 A1 * | 7/2014 | Chapman ............. B29C 70/461 |
| | | 264/296 |

OTHER PUBLICATIONS

Greenhalgh, E., C. Meeks, A. Clarke, J. Thatcher, The effect of defects on the performance of post-buckled CFRP stringer-stiffened panels, Composites Part A: Applied Science and Manufacturing, vol. 34, No. 7 (Jul. 2003), pp. 623-633. (Year: 2003).*

* cited by examiner

BULB STIFFENER WITH SINUSOIDAL WEB

RELATED APPLICATIONS

This application is a divisional of and claims priority to U.S. application Ser. No. 16/690,445 filed on Nov. 21, 2019, and entitled "Bulb Stiffener With Sinusoidal Web," which is incorporated by reference herein in its entirety.

BACKGROUND OF THE INVENTION

Stringers are stiffening members used to strengthen the skin of aircraft against buckling. Stringers typically extend along, and are joined to, an inner surface of aircraft skin of a wing or fuselage to reduce bending. The stringers transfer aerodynamic loads acting on the skin of the aircraft to frames, formers, ribs, or spars of the aircraft.

Stringers may have any of various cross-sectional shapes including HAT-shaped stringers (also known as Omega-shaped stringers), I-shaped stringers, J-shaped stringers, Y-shaped stringers, and Z-shaped stringers, among others. Typically, the particular cross-sectional shape chosen for a given application and material is one that provides a high moment of inertia with minimal mass to maximize the stiffness provided. In that regard, for stringers comprised of a stiff and preferably lightweight covering material such as alloys of aluminum, steel, and titanium, the stringers usually include a constant thickness profile shaped to maximize their moment of inertia and prevent first and second mode buckling using relatively thin sheet metal flanges.

Recently, more advanced forms of stringers have been formed from composite materials such as multiple layers, or plies, of suitable filler or fiber material bonded together using a resin matrix or the like. For such composite stringers, it is commonly believed that the most efficient profile is a HAT- or Omega-shaped stringer including two upstanding, slightly angled webs bridged by a cap. In such configurations, the cap creates a closed-section profile and thus increases torsional stiffness, allowing for the two webs to be made thinner than the cap, which in turn minimizes the weight of the stringer. Moreover, the two upstanding, angled webs provide enhanced resistance to damage from side loads. However, these HAT- or Omega-shaped stringers result in an internal hollow area, which increases the complexity of the tooling required to make such stringers and thus increases production costs.

More recently, bulb-shaped composite stringers have been used in lieu of HAT- or Omega-shaped stringers in an effort to avoid the drawbacks discussed above. These bulb-shaped stringers have been found to be ideally configured to utilize the properties of composite materials because they include highly aligned fibers at the stringer cap, away from the neutral axis, in a position where the fibers' high modulus contributes most effectively to section stiffness. More particularly, the cap can be composed almost exclusively of axial fibers (i.e., zero-percent fibers), providing greater stiffness than a similarly sized isentropic constant thickness metal. Moreover, such bulb-shaped stringers can be formed, in part, using automated processes such as pultrusion, thus reducing the cost of fabrication.

While such known bulb-shaped stringers provide enhanced stiffening properties, they are relatively susceptible to failure or shear buckling when exposed to relatively small abuse forces during manufacture, to shear stresses during use, or to other side loading typically encountered by stringers during manufacturing and use. Thus, these known bulb-shaped stringers are typically formed with a relatively thick web in an effort to provide increased resistance to side loading, which increases the production cost and weight of such stringers.

There remains a need for an improved composite stiffener such as a stringer or the like that exhibits the enhanced stiffness qualities of known bulb-shaped stringers, but one that is relatively lightweight and inexpensive to manufacture and can withstand abuse loads, shear forces, and other types of side loads during manufacture and use.

BRIEF SUMMARY OF THE INVENTION

The present invention is directed to an improved composite stiffener such a composite stringer or other composite reinforcing part, tooling for creating such a composite stiffener, and a process for creating such a composite stiffener. The improved composite stiffener exhibits the axial stiffness benefits of known bulb-type stringers and additionally includes improved lateral stiffness due to the presence of a sinusoidal or other non-linear web.

For example, some embodiments of the invention are directed to a bulb stiffener including one or more base flanges each having a generally planar shape, a composite rod extending in an axial direction, a bulb cap surrounding the composite rod, and an upright web extending from the one or more base flanges to the base cap. The upright web includes a non-linear profile in the axial direction providing the improved lateral stiffness.

Other embodiments of the invention are directed to a tooling assembly for forming a composite part, such as the bulb stiffener described above. The tooling assembly includes a first compression tool extending in an axial direction and including a first cutout portion and a first web portion, and a second compression tool extending in the axial direction and including a second cutout portion and a second web portion. Each of the first web portion and the second web portion includes a non-linear profile in the axial direction, used to form the web having a non-linear profile, discussed above. More particularly, the tooling assembly is configured to receive two or more plies and a composite rod in between, in a lateral direction perpendicular to the linear direction, the first compression tool and the second compression tool such that, when the tooling assembly compresses the first compression tool and the second compression tool in the lateral direction, first portions of the two or more plies and the composite are received between, in the lateral direction, the first cutout portion and the second cutout portion, and such that second portions of the two or more plies are received in between, in the lateral direction, the first web portion and the second web portion.

Still other embodiments of the invention are directed to a method for forming the bulb stiffener described above. The method includes providing a compression molding apparatus having a web forming portion having a non-linear profile in an axial direction, placing plies within the compression molding apparatus, and compressing the compression molding apparatus such that at least a portion of the plurality of plies are compressed in the web forming portion thereby forming a web of the bulb stiffener having a non-linear profile in the axial direction.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the invention are directed to an improved bulb stiffener—such as a bulb-shaped stringer or other bulb-shaped reinforcing member for a vehicle such as an aircraft or the like—which exhibits the high moment of inertia and the low weight benefits of known bulb-shaped stringers, but which includes an improved web with increased lateral strength to withstand commonly encountered side or shear loads. More particularly, the bulb stiffener utilizes the proven bulb cap design made from low cost pultrusion stock with nearly 100% axial fibers in combination with a sinusoidal shear web that prevents shear buckling and provides a much greater lateral stiffness without adding much material. Aspects of the invention use material forms and processes that are more well suited to composite manufacturing methods while avoiding the hollow areas of HAT- or Omega-shaped stringers that require removable mandrels or other complex tooling. This is particularly advantageous for stiffeners made from thermoplastic composites, where processing temperatures preclude the use of elastomers needed to manufacture the hollow core HAT- or Omega-shaped stringers. The sinusoidal web undulates the entire width of the bulb and provides enhanced resistance to shear stress and other side loading, which enables the bulb stiffener to be utilized in applications where known bulb-type stringers are not suitable because the thin web is susceptible to buckling in the presence of shear stresses. The sinusoidal or similar web provides lateral strength necessary to withstand such side loads or shear stresses.

Figure 1:
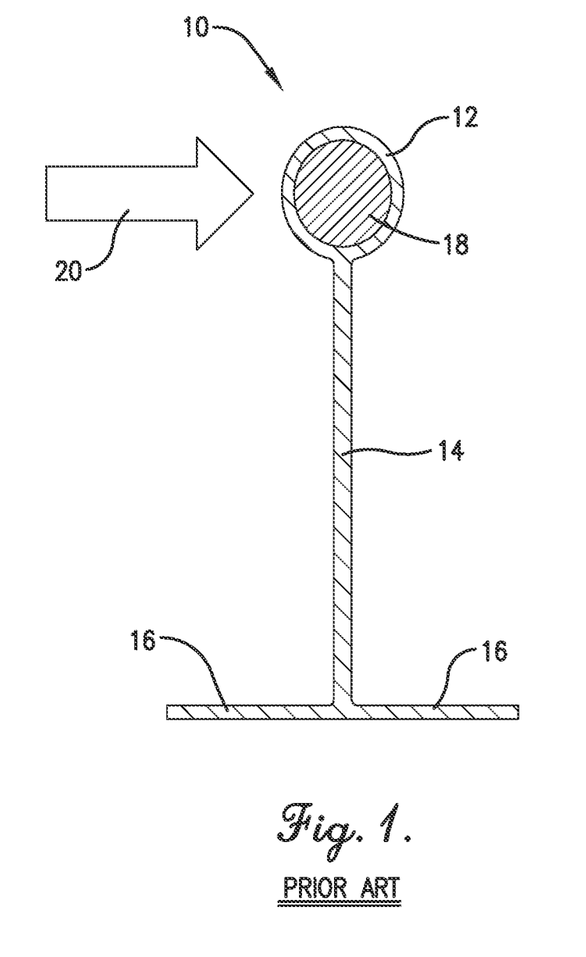
FIG. 1 is a front elevation view of a prior-art bulb stringer.

FIG. 1 shows a prior-art bulb stringer 10. The stringer 10 generally includes a round cap 12, a pair of flanges 16 configured to be stitched or otherwise attached to an aircraft or other vehicle skin (not shown), and a generally upstanding web 14 extending from the pair of flanges 16 to the cap 12. Enclosed by the cap 12 is a pultruded rod 18. Typically, the pultruded rod 18 is formed from almost entirely axial fibers (also referred to a zero-degree fibers) such that the rod 18 resists bending in the axial direction of the rod, thus providing the increased stiffening or reinforcing benefits for the aircraft skin to which it is attached.

While the prior-art bulb stringer 10 has proven effective from a stiffening standpoint and is relatively easily manufactured from composite materials because there are no hollow areas requiring complex tooling, the stringer 10 is susceptible to failure in the presence of side loads or other shear stresses, such as those schematically illustrated by arrow 20 in FIG. 1. More particularly, when overstressed composites do not yield and thus fail in a brittle mode. Thus, stiffeners, such as the bulb stringer 10, must be designed to withstand commonly encountered abuse loads from occupants, tool drops, and cargo, as well as various shear forces sustained during use without damage. Because unlike HAT- or Omega-shaped stringers the bulb stringer 10 does not include a pair of angled webs but instead includes only a relatively thin, upstanding web 14, the bulb stringer is particularly susceptible to damage during manufacture or in service from relatively low forces commonly encountered. Often, to avoid such damage, the upstanding web 14 is manufactured thicker than is typically necessary for the shear web function, adding cost and weight. Additionally, the web 14 must be thick enough to prevent shear buckling from the shear stresses flowing from the compression to the tension side of the beam as it is bent, again requiring a relatively thick (and thus costly and heavy) web 14.

Aspects of the invention overcome such drawbacks of the bulb stringer 10 by implementing a sinusoidal web providing enhanced resistance to shear loading and abuse forces, thus exhibiting the enhanced stiffening properties of a composite bulb stringer while simultaneously providing increased resistance to shear buckling.

More particularly, some embodiments of the invention are directed to a bulb stiffener 22 with a sinusoidal or other non-linear web 26 as shown in FIGS. 2-6. The bulb stiffener 22 generally includes a bulb cap 24, a pair of base flanges 28, and a sinusoidal web 26 upstanding from the base flanges 28 and extending to the bulb cap 24. Inside the bulb cap 24 is a composite rod 30, with an outer perimeter of the composite rod 30 generally contouring to the profile of the bulb cap 24. More particularly, as best seen in FIGS. 3-6, the bulb cap 24 (and thus the composite rod 30) generally has a truncated circular cross-sectional profile, including an arcuate portion 25 and a flat portion 27 provided at the bottom of the bulb cap 24. In other embodiments, the bulb cap 24 (and thus composite rod 30) may have other cross-sectional profiles without departing from the scope of this disclosure, such as circular (similar to the profile of cap 12 and pultruded rod 18 shown in FIG. 1) or other desired cross-sectional shape.

The bulb cap 24, sinusoidal web 26, and flanges 28 are constructed from any suitable composite material such as, in some embodiments, carbon fiber or glass fiber fabric pre-impregnated with a thermoplastic or thermoelastic resin, while the composite rod 30 may be a pultruded composite rod or similar. For example, as will become more apparent in connection with the discussion of FIGS. 7-10, in some embodiments the bulb cap 24, sinusoidal web 26, and flanges 28 are constructed from multiple plies of +/−45-degree pre-impregnated carbon fiber or glass fiber fabric, while the composite rod 30 is pultruded zero-degree fiber (i.e., the fibers are aligned in the axial direction of the primary stress and the rod 30).

Figure 2:
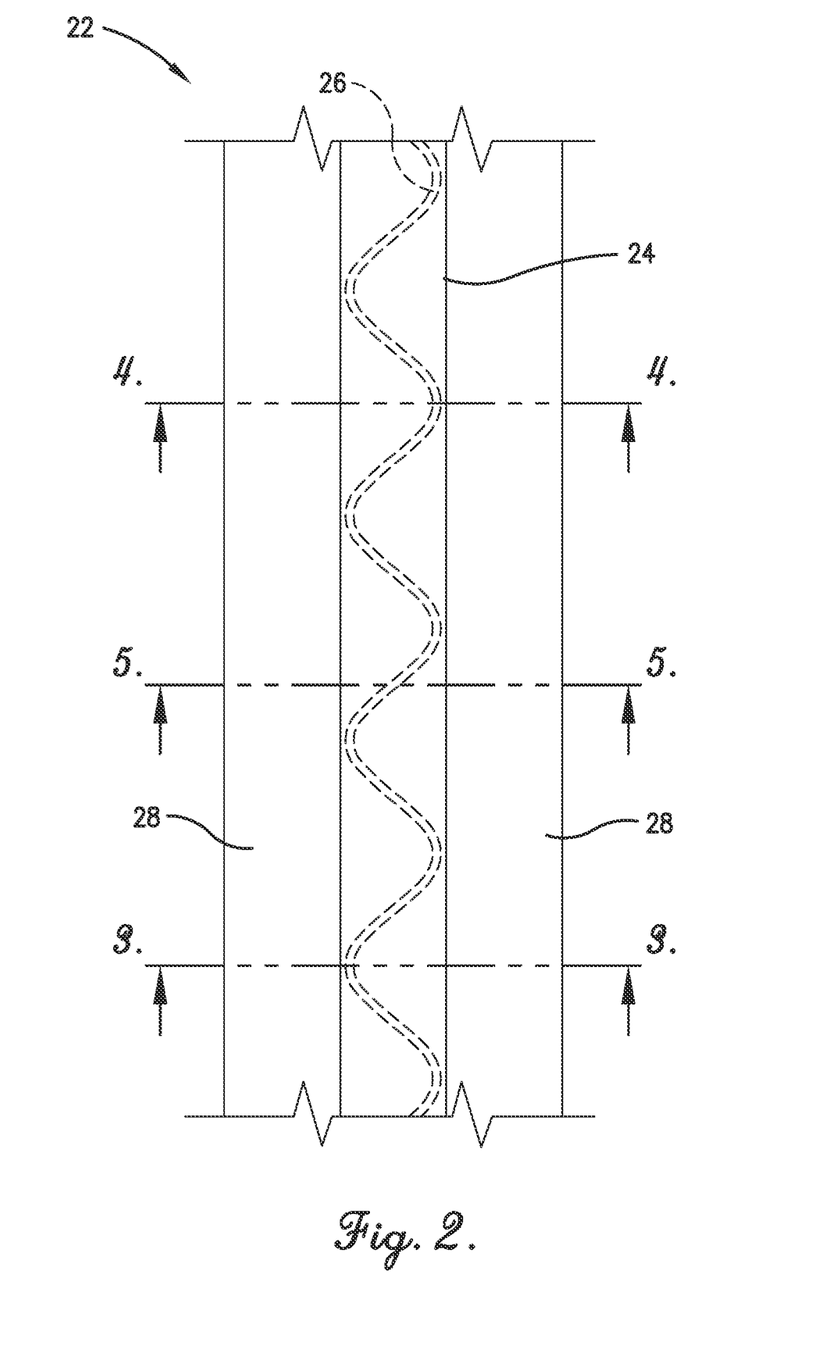
FIG. 2 is a top plan view of a bulb stiffener having a sinusoidal web according to aspects of the invention.
Figure 6:
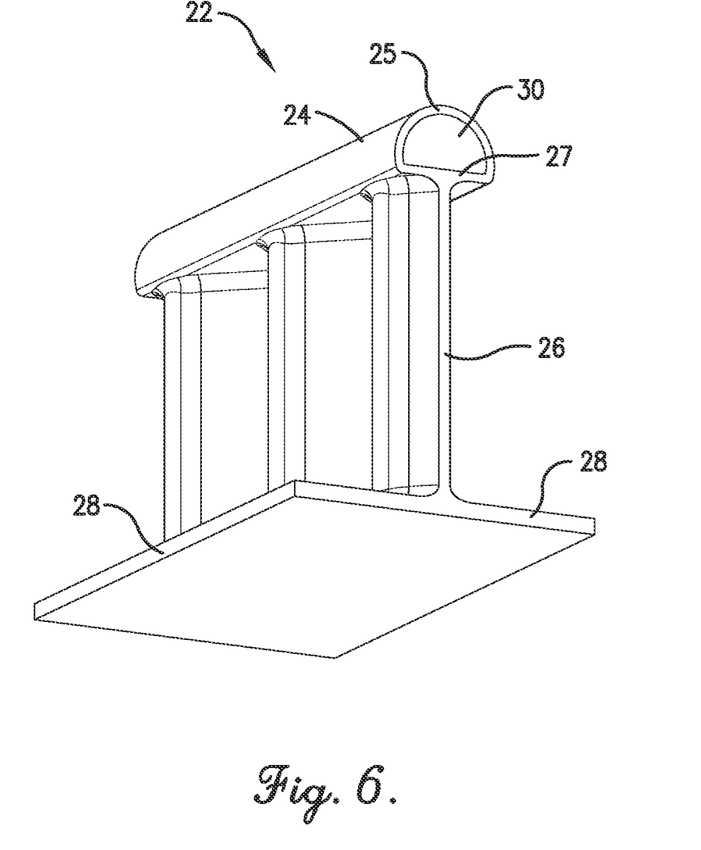
FIG. 6 is a perspective view of the bulb stiffener having the sinusoidal web shown in FIGS. 2-5.

As best seen in FIGS. 2 and 6, the web 26, in plan view, generally has a profile following a sinusoidal curve. More particularly, the profile of the web 26, when viewed along an axial direction, is a sine wave centered along the flat portion 27 of the bulb cap 24 having an amplitude equal to half the width of the flat portion 27. In this regard, the web 26 meets and is connected to the flat portion 27 of the bulb cap 24 at various lateral positions along the axial length of the bulb cap 24. As used herein, the "axial" direction refers to direction extending generally in the direction of the central axis of the composite rod 30—i.e., the up-and-down direction as view in FIG. 2—while the "lateral" direction refers to direction generally perpendicular to the axial direction and generally parallel to the flat portion 27—i.e., the left-and-right direction as viewed in FIG. 2.

More particularly, at certain axial locations, such as the location denoted by line 3-3 in FIG. 2, the web 26 is located at one outermost (i.e., leftmost) side of the flat portion 27, while at other axial locations, such as the location denoted by line 4-4 in FIG. 2, the web 26 is located at the other outermost (i.e., rightmost) side of the flat portion 27. And at still other locations the web 26 is located somewhere between the leftmost and rightmost sides of the flat portion 27, generally following a sinusoidal path in the axial direction. For example, at the location denoted by line 5-5 in FIG. 2, the web 26 is located at the center of the flat portion 27.

Figure 3:
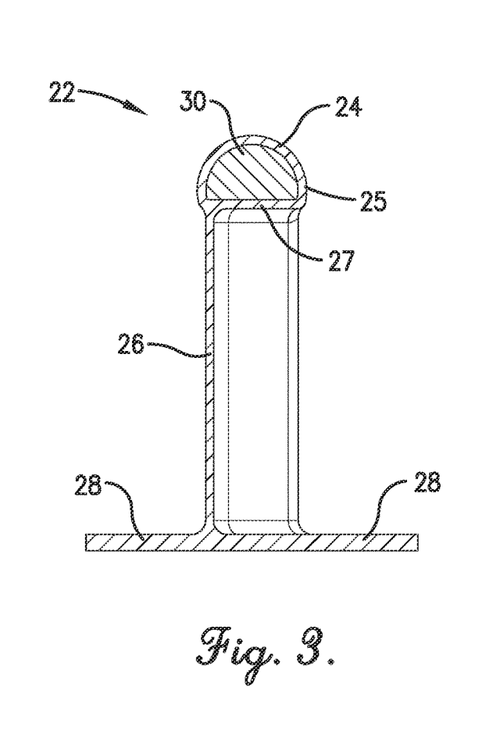
FIGS. 3-5 are a cross-sectional views of the bulb stiffener having the sinusoidal web as viewed along lines 3-3, 4-4, and 5-5, respectively, in FIG. 2.
Figure 4:
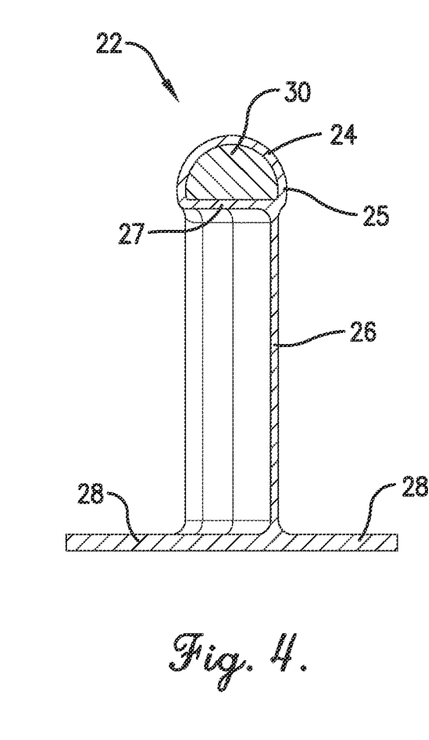
Figure 5:
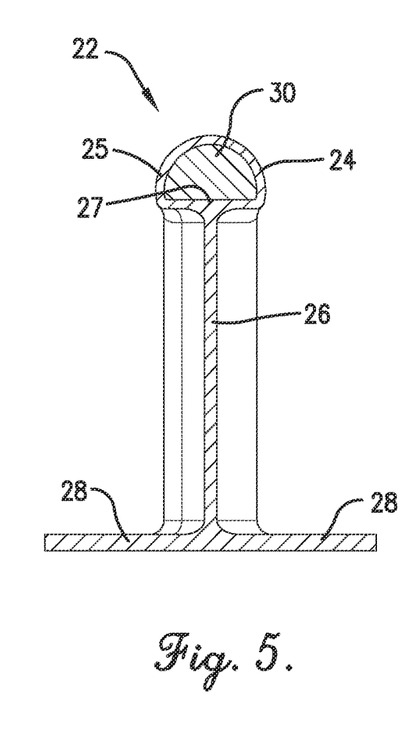

This will be more readily understood with reference to FIGS. 3-5, which show cross-sectional profiles of the bulb stiffener as viewed along lines 3-3, 4-4, and 5-5, respectively. First, FIG. 3 shows the cross-sectional profile of the bulb stiffener 22 as viewed along line 3-3 in FIG. 2, which is an axial location where the sinusoidal wave is nearest the left side of the flat portion 27 of the bulb cap 24. At this location, the base flanges 28 may be of unequal length because the web 26 does not bisect the base plies making up the flanges 28 at a center portion thereof, but instead is nearer to a left end of the flanges 28 than a right end. The web 26 extends vertically from that location and connects with the bulb cap 24—more particularly with the flat portion 27 of the bulb cap 24—at or proximate to a leftmost side of the flat portion 27.

Conversely, FIG. 4 shows essentially a mirror image of the cross-sectional profile shown in FIG. 3, because it shows the cross-sectional profile of the bulb stiffener 22 as viewed along line 4-4 in FIG. 2, which is an axial location where the sinusoidal wave is nearest the right side of the flat portion 27 of the bulb cap 24. At this location, the base flanges 28 also may be of unequal length but this time with the web 26 being nearer to a right end of the flanges 28 than a left end. The web 26 extends vertically from that location and connects with the bulb cap 24— more particularly with the flat portion 27 of the bulb cap 24—at or proximate to a rightmost side of the flat portion 27.

FIG. 5, in turn, shows a location where the web 26 is in a center of the bulb stiffener 22 and thus bisects the base flanges 28 and/or the flat portion 27. More particularly, FIG. 5 shows the cross-sectional profile of the bulb stiffener 22 as viewed along line 5-5 in FIG. 2, which is an axial location where the sinusoidal wave is at or proximate to the center of the flat portion 27 of the bulb cap 24. At this location, the base flanges 28 may be equal length because the web 26 bisects the base plies making up the flanges 28. The web 26 extends vertically from that location and connects with the bulb cap 24—more particularly with the flat portion 27 of the bulb cap 24—at or proximate a center point of the flat portion 27 in the lateral direction.

As should be appreciated, the cross-sectional profiles shown in FIGS. 3-5 are just three exemplary profiles illustrating three different lateral locations of the web 26 along the bulb stiffener 22's axial length, but the web 26 is also connected to other lateral locations of the flat portion 27 of the bulb cap 24 at different axial locations of the bulb stiffener 22. Put another way, and as best seen in FIGS. 1 and 6, the web 26 spans the entire lateral width of flat portion 27, such that there are an infinite number of cross-sectional profiles having different lateral locations where the web 26 meets the flat portion 27. This provides increased lateral stiffness as compared to the prior-art bulb stringer 10.

More particularly, unlike the web 14 of the prior-art bulb stringer 10, which is located at a single lateral location along the entire axial length of the bulb stringer 10, the sinusoidal web 26 has both axial and lateral components. By extending generally axially, the web 26 exhibits similar stiffening benefits as the webs 14 of the prior-art bulb stringers 10. But, by also including lateral components via the generally sinusoidal profile (when viewed from above, as shown in FIG. 2), the bulb stiffener 22 exhibits increased resistance to shear buckling and other side loads, such as the one schematically illustrated by arrow 20 in FIG. 1. In this regard, the web 26 can be thinner than the web 14 of the prior-art bulb stringer 10 yet still exhibit increased resistance to abuse forces commonly encountered during manufacture and installation as well as shear buckling encountered during use.

Figure 7:
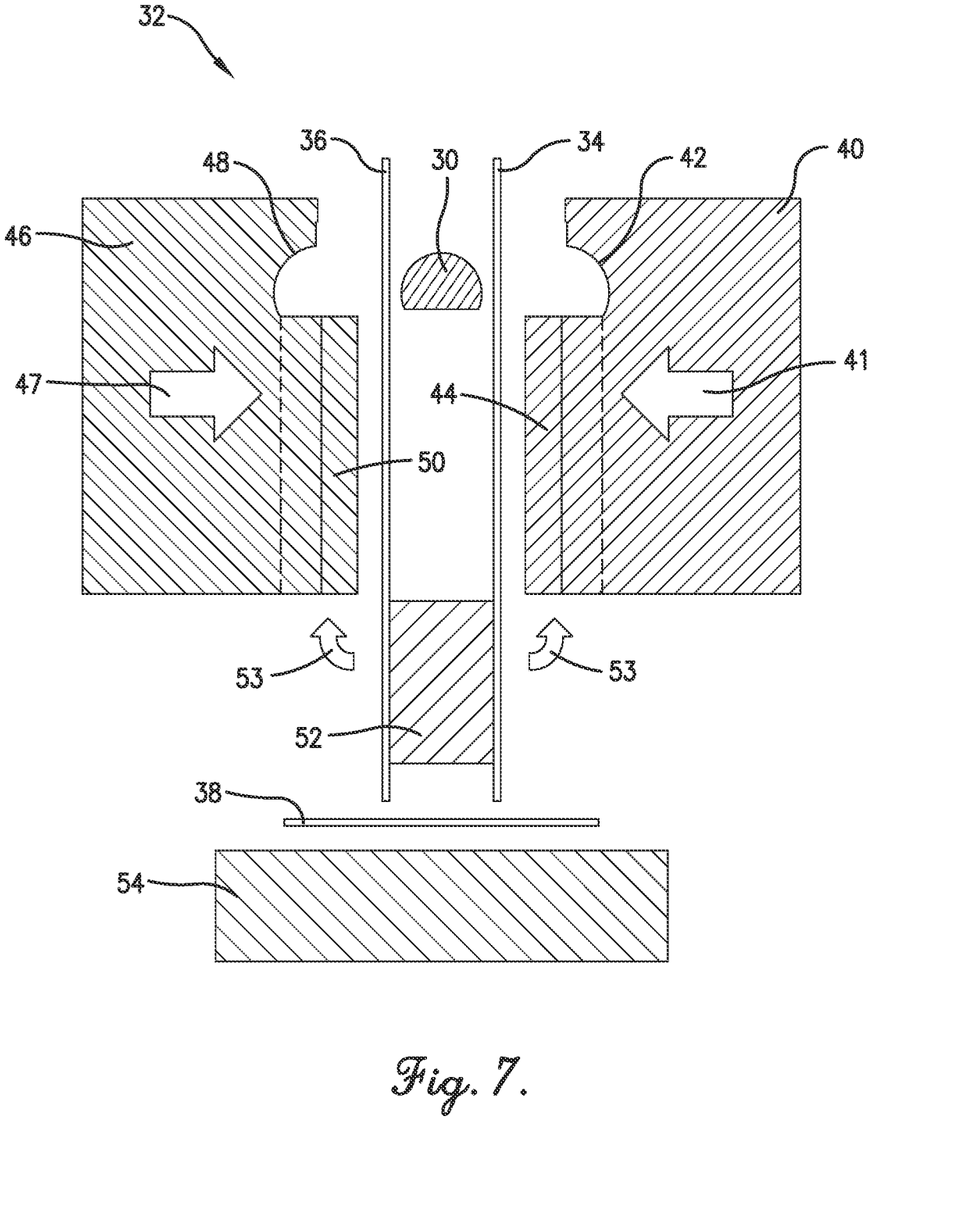
FIG. 7 is a front elevation view of a compression molding apparatus in a first state, which is used to make the bulb stiffener having the sinusoidal web shown in FIGS. 2-6.

Turning now to FIGS. 7-11, tooling used to create such a bulb stiffener 22 having a sinusoidal or other non-linear web 26 will be described in detail. More particularly, FIG. 7 shows a compression molding apparatus 32 as one example of a tooling apparatus that is used to manufacture the bulb stiffener 22 shown in FIGS. 2-6. The compression molding apparatus 32 generally includes first compression tool 40, a second compression tool 46, a third compression tool 52, and a fourth compression tool 54.

Figure 9:
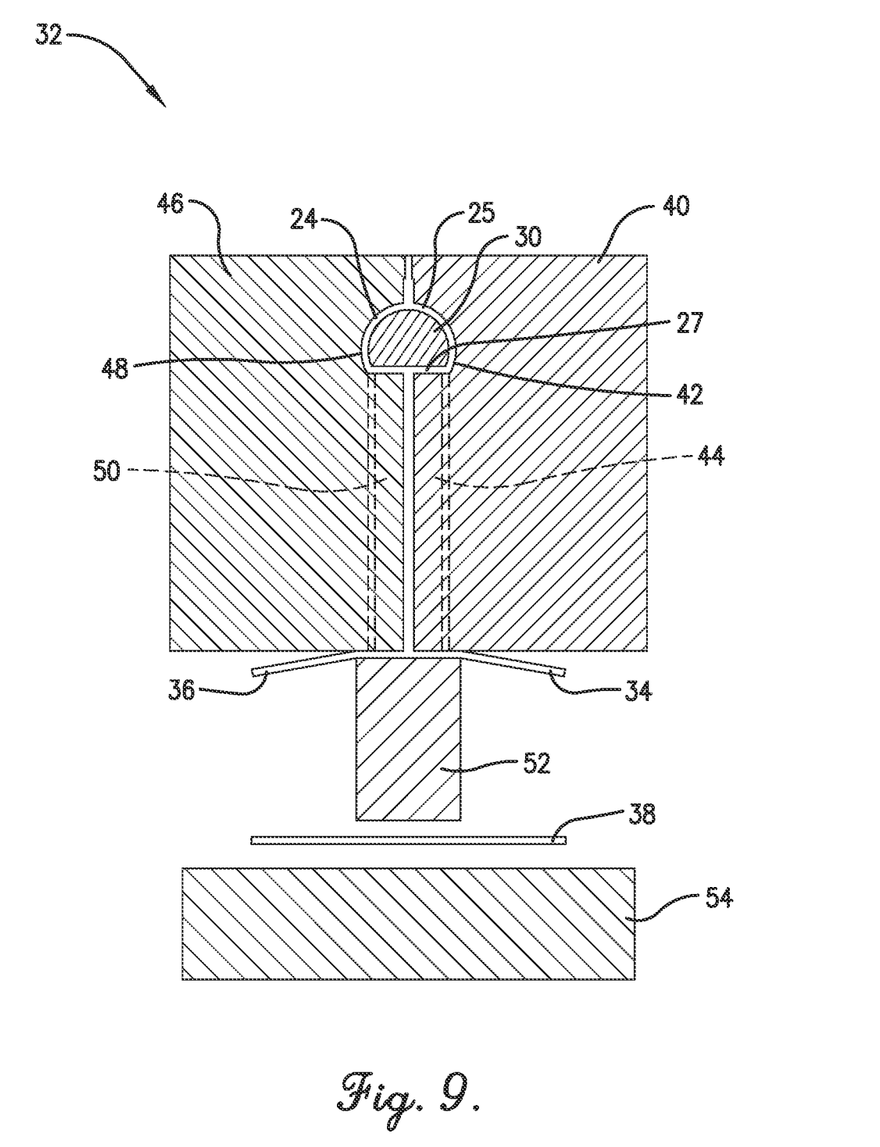
FIG. 9 is a front elevation view of the compression molding apparatus shown in FIGS. 7-8 in a second state.
Figure 10:
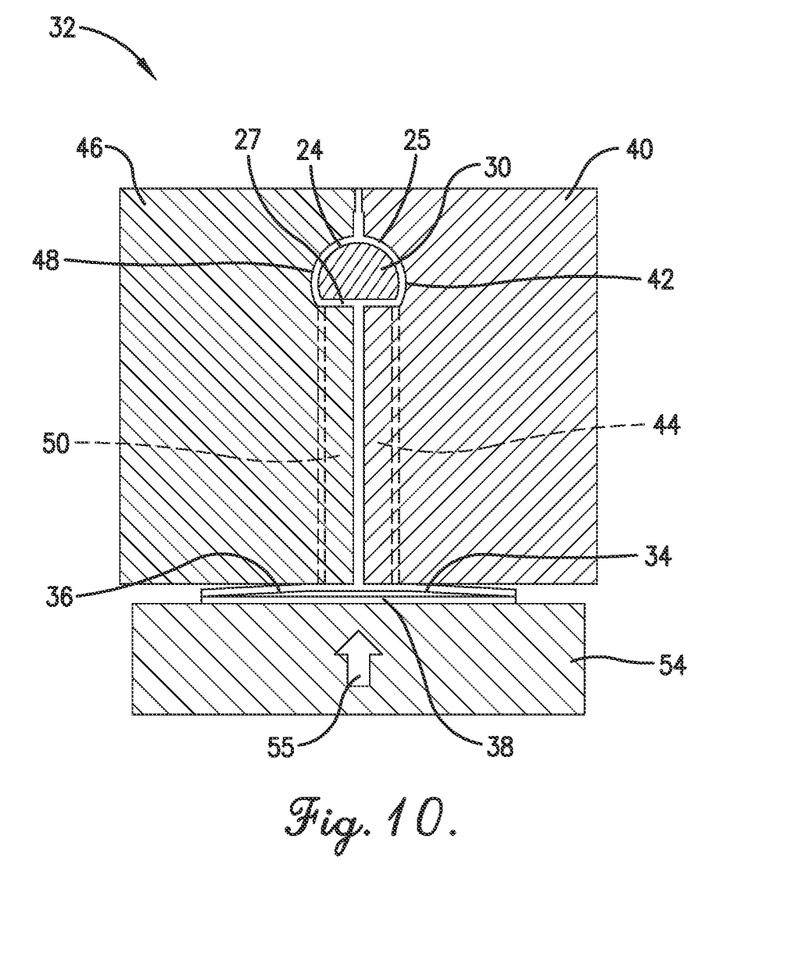
FIG. 10 is a front elevation view of the compression molding apparatus shown in FIGS. 7-9 in a third state.

The first compression tool 40 and second compression tool 46 generally include, on a side facing materials being used to form the bulb stiffener 22, a cutout portion 42, 48 and a sinusoidal portion 44, 50. As best seen in FIG. 7, the first cutout portion 42 and the second cutout portion 48 are generally contoured similar to an outer profile of the composite rod 30 being used to form the bulb cap 24 of the bulb stiffener 22. In this regard, when the composite rod 30 has a truncated circular cross-sectional profile including the arcuate portion 25 and the flat portion 27 provided at the bottom of the bulb cap 24 as discussed above, each cutout portion 42, 48 similarly has an arcuate portion and a flat portion that, when compressed together generally follow the outer profile of the composite rod 30 (FIG. 9).

Figure 8:
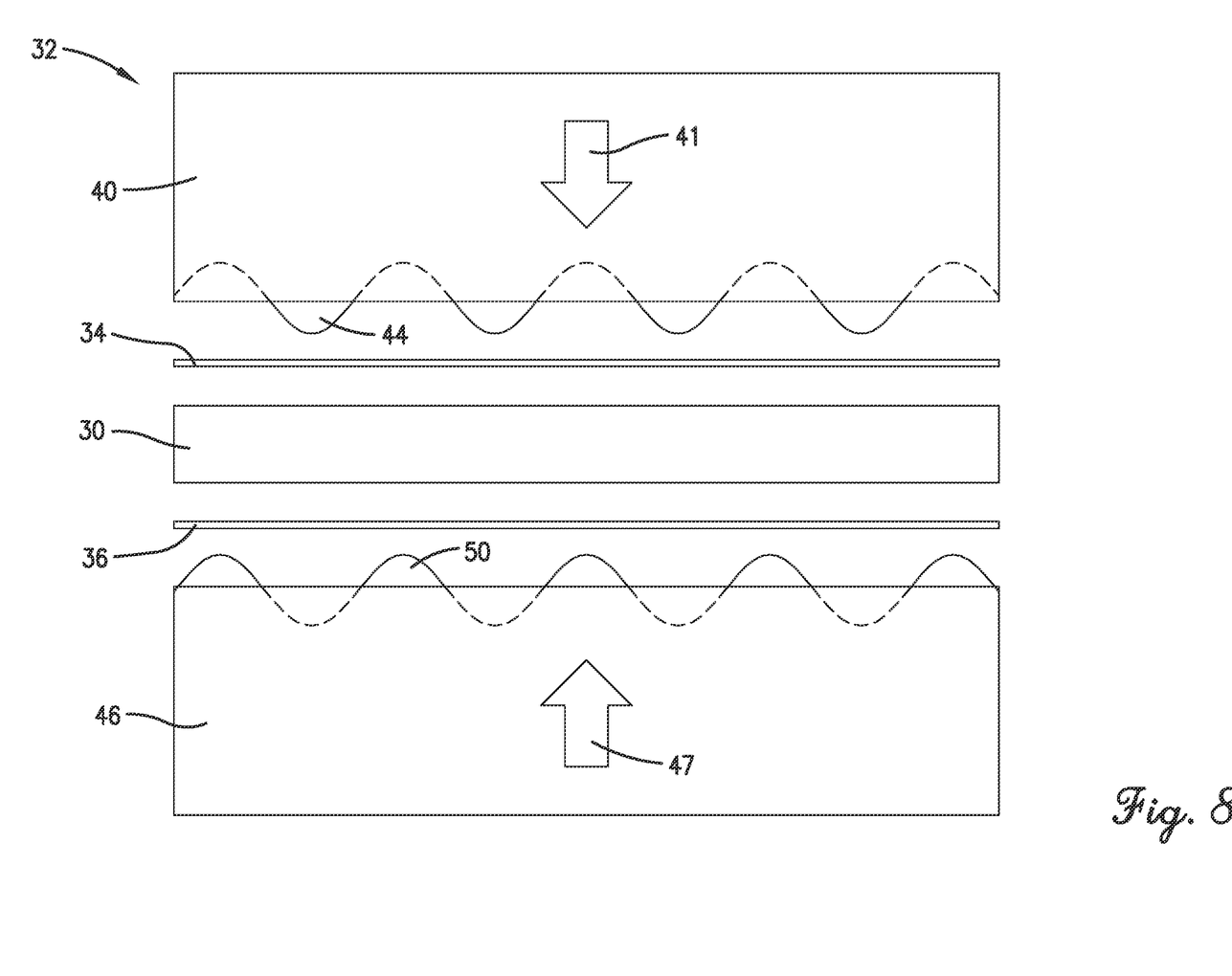
FIG. 8 is a top plan view of the compression molding apparatus shown in FIG. 7.

Below the cutout portions 42, 48 are first and second sinusoidal portions 44, 50. As best seen in FIG. 8, which shows the tooling in the state shown in FIG. 7 but from above, the sinusoidal portions 44, 50 each have a sinusoidal profile configured such that the first sinusoidal portion 44 will mesh with the second sinusoidal portion 50 when the first and second compression tools 40, 46 come together (FIG. 9), as will be discussed in more detail.

Below the first and second compression tools 40, 46 is the third and fourth compression tools 52, 54. The third and fourth compression tools 52, 54 are depicted as having a rectangular cross-sectional profile for simplicity, but in other embodiments may include other cross-sectional profiles without departing from the scope of the invention. In any event, the third compression tool 52 is sized and configured to fold and position a first layer of plies used to create the base flanges 28 of the bulb stiffener 22, while the fourth compression tool 54 is sized and configured to compress a second layer of plies used to create the base flanges 28, as will be discussed in more detail.

In some embodiments, the bulb stiffener 22 is manufactured by placing melted or uncured fiber fabric or other composite material within the compression molding apparatus 32 and compressing the first, second, third, and fourth compression tools 40, 46, 52, and 54 in a coordinated fashion to create the bulb stiffener 22. For example, when the compression molding apparatus 32 is in the uncompressed state as shown in FIGS. 7 and 8, the composite rod 30— which in some embodiments may be a composite rod 30 created utilizing a separate pultrusion process (not shown)—is placed in the compression molding apparatus 32 proximate the first and second cutout portions 42, 48 of the first and second compression tools 40, 46, respectively. Moreover, and as discussed above, in some embodiments the composite rod 30 may be constructed almost entirely of zero-percent fibers; that is, fibers that are aligned in the axial direction of the rod 30.

Between the rod 30 and each of the first and second compression tool 40, 46 is placed a first ply 34 and a second ply 36, respectively. In some embodiments, the first and second plies 34, 36 are melted or uncured pre-impregnated glass fiber or carbon fiber fabric, which in some embodiments may include +/−45-degree fabric. As should be appreciated, +/−45-degree fabric refers to carbon or glass fiber fabric (which, in some embodiments, may be pre-impregnated with a suitable thermoplastic or thermoelastic epoxy or resin), in which the fibers are woven at +/−45 degrees relative to the fabric's length in order to provide strength in various directions. As seen in FIG. 7, in some embodiments the first and second plies 34, 36 are arranged such that the composite rod 30 and the third compression tool 52 are sandwiched by the two plies 34. In some embodiments, a base ply 38 may be placed below the lower distal ends of the first and second plies 34, 36 and/or below the third compression tool 52. Again, in some embodiments the base ply 38 can be a +/−45-degree fabric and in some embodiments may be pre-impregnated with a suitable thermoplastic or thermoelastic epoxy or resin.

The first, second, and base plies 34, 36, 38 are melted (if a thermoplastic resin or epoxy is being used) or uncured (when a thermoset resin or epoxy is being used) when placed into the compression molding apparatus 32 and/or before the compression molding apparatus 32 is compressed such that they are moldable or otherwise amenable to forming into a desired shape upon compression. Then, at a first step, the first and second compression tools 40, 46 are compressed together to generally form the bulb cap 24 and the sinusoidal web 26. More particularly, the first and second compression tools 40, 46 are moved towards one another—as schematically illustrated by arrows 41 and 47—such that the inner surfaces of each, including the cutout portions 42, 48 and the sinusoidal portions 44, 50, come together and compress the plies 34, 36 therebetween. More particularly, the first cutout portion 42 generally compresses a portion of the first ply 34 about the outer surface of the composite rod 30, the second cutout portion 48 generally compresses a portion of the second ply 36 about the outer surface of the composite rod 30, and the first sinusoidal portion 44 meshes with the second sinusoidal portion 50 thereby sandwiching and compressing the first and second ply 34 and 36 therebetween. Moreover, as the first and second compression tool 40, 46 come together, the lower ends of the first and second plies 34, 36 are generally bent upwards (FIG. 9) due to the presence of the third compression tool 52, as schematically illustrated by arrows 53 (FIG. 7). It can be appreciated by one skilled in the art that in conforming to the shape of the sinusoidal portion of the tool substantial elongation of the material may be required. This can be accommodated by trellising when +/−45-degree fibers used for the first and second plies 34 and 36 in a partial forming operation as necessary prior to the step of compression molding or by the use of discontinuous aligned fiber such as patented by the University of Delaware (US20190048500A1) or stretch broken fiber to provide the necessary elongation.

As best seen in FIG. 9, once the first and second compression tools 40, 46 are in the compressed state, the first and second plies 34, 36 have generally formed the bulb cap 24 (surrounding the composite rod 30) and the sinusoidal web 26. The compression tools 40, 46 thus remain in this position until the bulb cap 24 and sinusoidal web 26 cool and harden (if a thermoplastic resin or epoxy is being used) or heat and cure (when a thermoset resin or epoxy is being used).

Moreover, the base flanges 38 are constructed in some embodiments by adding a base ply 38 to the lower distal ends of the first and second plies 34, 36. Again, when the first and second compression tools 40, 46 were brought together, the lower ends of the plies 34, 36 folded upward (schematically shown by arrows 53 in FIG. 7), roughly into the shape of the base flanges 28 of the bulb stiffener 22. In some embodiments, a base ply 38 may be added to the lower ends of the first and second plies 34, 36 to complete the base flanges 28. More particularly, the third compression tool 52 is removed from below the first and second compression tools 42, 46, and the base ply 38 is provided to the compression tooling apparatus 32, below the first and second compression tools 40, 46 and above the fourth compression tool 54. Again, in some embodiments the base ply 38 may be melted (if a thermoplastic resin or epoxy is being used) or uncured (when a thermoset resin or epoxy is being used) when placed into the compression molding apparatus 32. The fourth compression tool 54 is then compressed (i.e., moved towards the first and second compression tool 40, 46 as schematically illustrated by arrow 55), thus compressing the first ply 34, second ply 36, and base ply 38 between the first, second, and third compression tools 40, 46, 54. The compression tools 40, 46, 54 remain in this position until the base flanges 28 cool and harden (if a thermoplastic resin or epoxy is being used) or heat and cure (when a thermoset resin or epoxy is being used).

Figure 11:
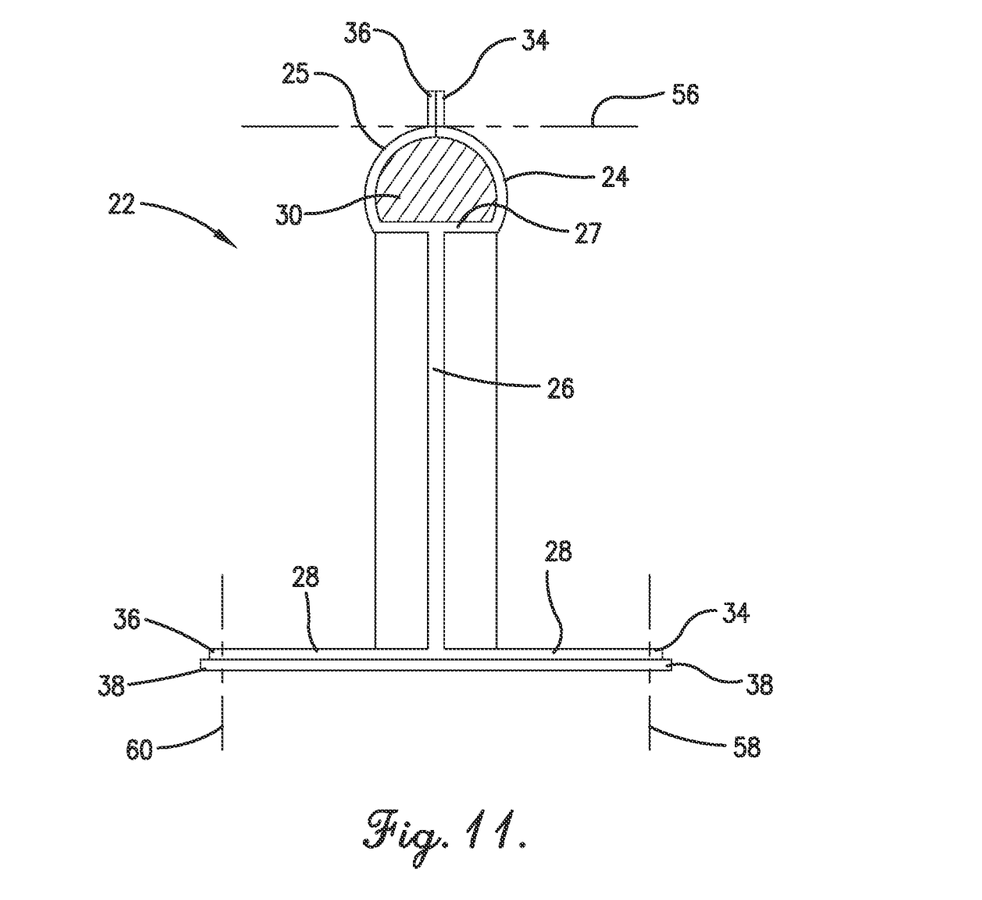
FIG. 11 is a front elevation view of the bulb stiffener having the sinusoidal web after leaving the compression molding apparatus shown in FIGS. 7-10 and prior to a finishing process.

Once the plies 34, 36, 38 are cooled or cured, the plies 34, 36, 38 and composite rod 30 are removed from the compression molding apparatus 32, as shown in FIG. 11. In some embodiments, the plies 34, 36, 38 are then trimmed to form the bulb stiffener 22 shown in FIGS. 2-6. For example, any portion of the first and second plies 34, 36 that extend above the bulb cap 24 may be trimmed as schematically illustrated by first trim line 56. Any portions of the first ply 34 and base ply 38 that extends outwardly more than the right base flange 28 may be trimmed as schematically illustrated by second trim line 58. And any portions of the second ply 36 and base ply 38 that extends outwardly more than left base flange 28 may be trimmed as schematically illustrated by third trim line 60. Following such cuts, the bulb stiffener 22 will resemble that shown in FIGS. 2-6 and thus be ready for stitching or otherwise connecting to an aircraft skin or other vehicle part.

Figure 12:
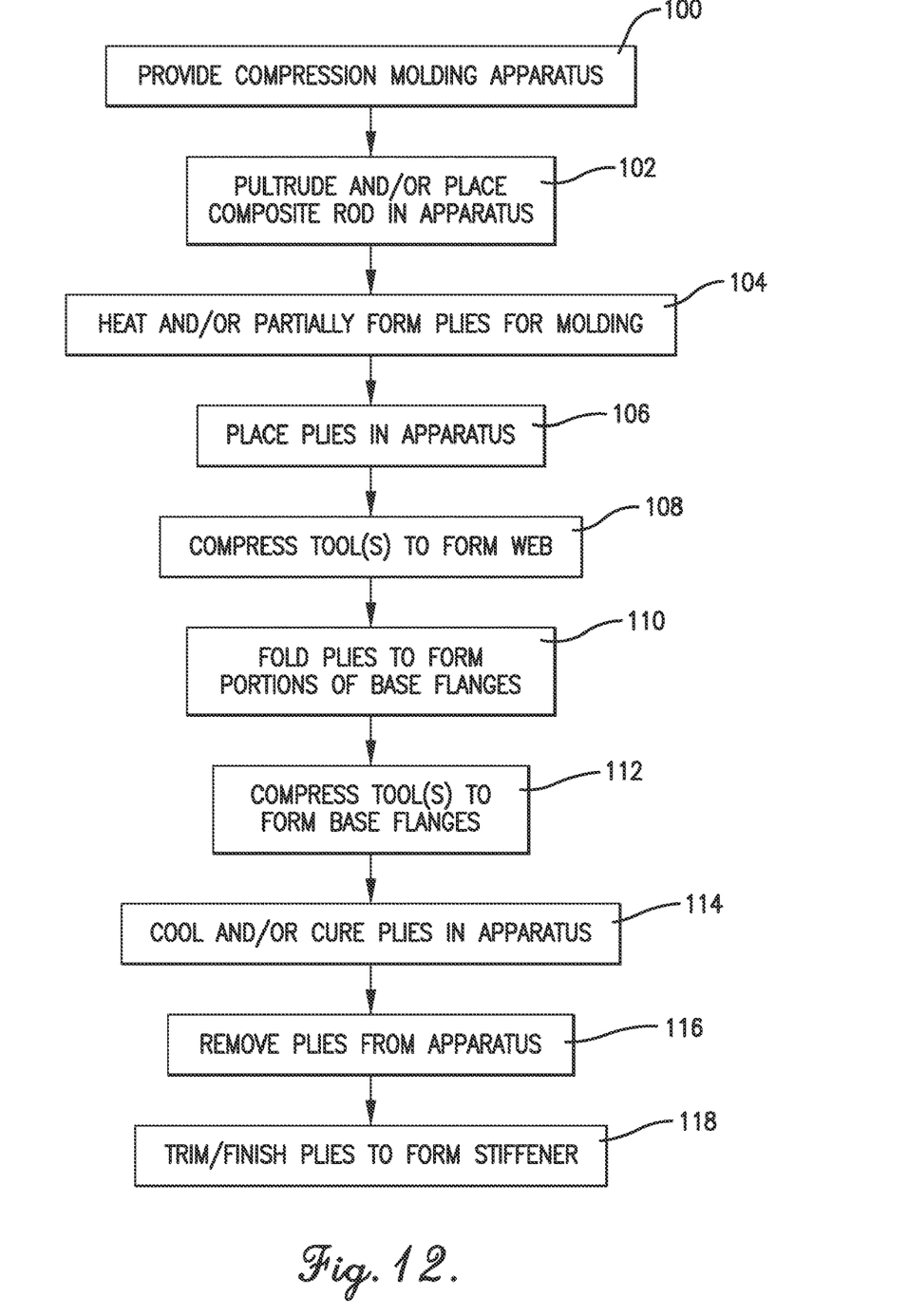
FIG. 12 is flowchart of a method used to produce the bulb stiffener having the sinusoidal web shown in FIGS. 2-6 and 11, using the compression molding apparatus shown in FIGS. 7-10.

FIG. 12 is a flowchart showing the various steps of a process used to form a bulb stiffener 22 according to some embodiments of the invention. At step 100, a tooling apparatus for forming the bulb stiffener 22, such as the molding apparatus 32 shown and discussed in connection with FIGS. 7-11, is provided. At step 102, a composite rod 30 forming an interior of the bulb cap 24 is placed in compressing molding apparatus 32. In embodiments where the composite rod 30 is made using a pultrusion or similar continuous manufacturing process, the rod 30 may also be pultruded at this step, prior to being placed in the compression molding apparatus 32.

At step 104, multiple composite plies are heated and/or prepared for molding. For example, the +/−45-degree fabric used for the first ply 34, second ply 36, and/or base ply 38 is prepared for molding at step 104. When the fabric is pre-impregnated with or otherwise provided with a thermoplastic resin, this may include heating the fabric and/or resin to liquefy the resin and thus prepare it for molding. And when the fabric is pre-impregnated with or otherwise provided with a thermoset resin, this may include otherwise preparing the soft solid or viscous liquid resin for molding.

At step 106, the plies 34, 36, 38 are placed in the apparatus. The first and second plies 34, 36 are placed and arranged such that they generally face the cutouts 42, 48 and the sinusoidal portions 44, 50 of the first and second compression tools 40, 46, respectively, while the base ply 38 may be placed below the first and second plies 34, 36 and generally perpendicular thereto such that the base ply 38 generally faces the lower end of the first and second compression tools 40, 46. Moreover, the first and second plies 34, 36 may be placed in the compression molding apparatus 32 in such a way that the composite rod 30 and/or a third compression molding tool are in between the first ply 34 and the second ply 36.

At step 108, one or more tools—such as the first compression tool 40 and the second compression tool 46—are compressed to form the sinusoidal web 26 and bulb cap 24. As explained in connection with FIGS. 7-9, this step involves bringing the tools 40, 46 together such that the first and second plies 34, 36 are compressed therebetween, thereby generally conforming to the outer perimeter of the composite rod (thus forming the bulb cap 24) as well as to the sinusoidal profile of the first and second sinusoidal portions 44, 50 (thereby forming the sinusoidal web 26). Optionally, simultaneously with step 108 or thereafter, at step 110 portions of the plies 34, 36 may be folded towards the first and second compression tools 40, 46 using a third compression tool 52 or the like, generally forming the upper layer of the base flanges 28.

At step 112, a fourth compression tool 54 compresses the first ply 34, second ply 36, and base ply 38 against the first and second compression tools 40, 46 forming the base flanges 28. Once all plies 34, 36, 38 are in place, at step 114 the plies are cooled or cured within the compression molding apparatus 32 thereby solidifying and forming the generally rigid bulb stiffener 22. Once solidified, the plies 34, 36, 38 are removed from the compressing molding apparatus 32 at step 116, and trimmed or otherwise finished at step 118. Again, in such embodiments this finishing step may include trimming excess portions of the first and second ply 34, 36 from above the bulb cap 24 at trim line 56, or trimming excess portions of the first, second, and base plies 34, 36, 38 from the base flanges 28 at trim lines 58 and 60. Once finished, the bulb stiffener will be generally in the form shown in FIGS. 2-6 and ready for attachment to an aircraft skin or the like.

Although the various embodiments described herein implement a sinusoidal web 26, webs having other non-linear profiles in the axial direction could be implemented without departing from the scope of the invention. For example, and turning to FIG. 13, in addition to a generally sinusoidal shaped web 26, in other embodiments the web may include, in the axial direction, a profile resembling a square wave 66, a profile resembling a triangle wave 76, a profile resembling a sawtooth wave 86, or any other desired non-linear profile without departing from the scope of the invention.

Figure 13:
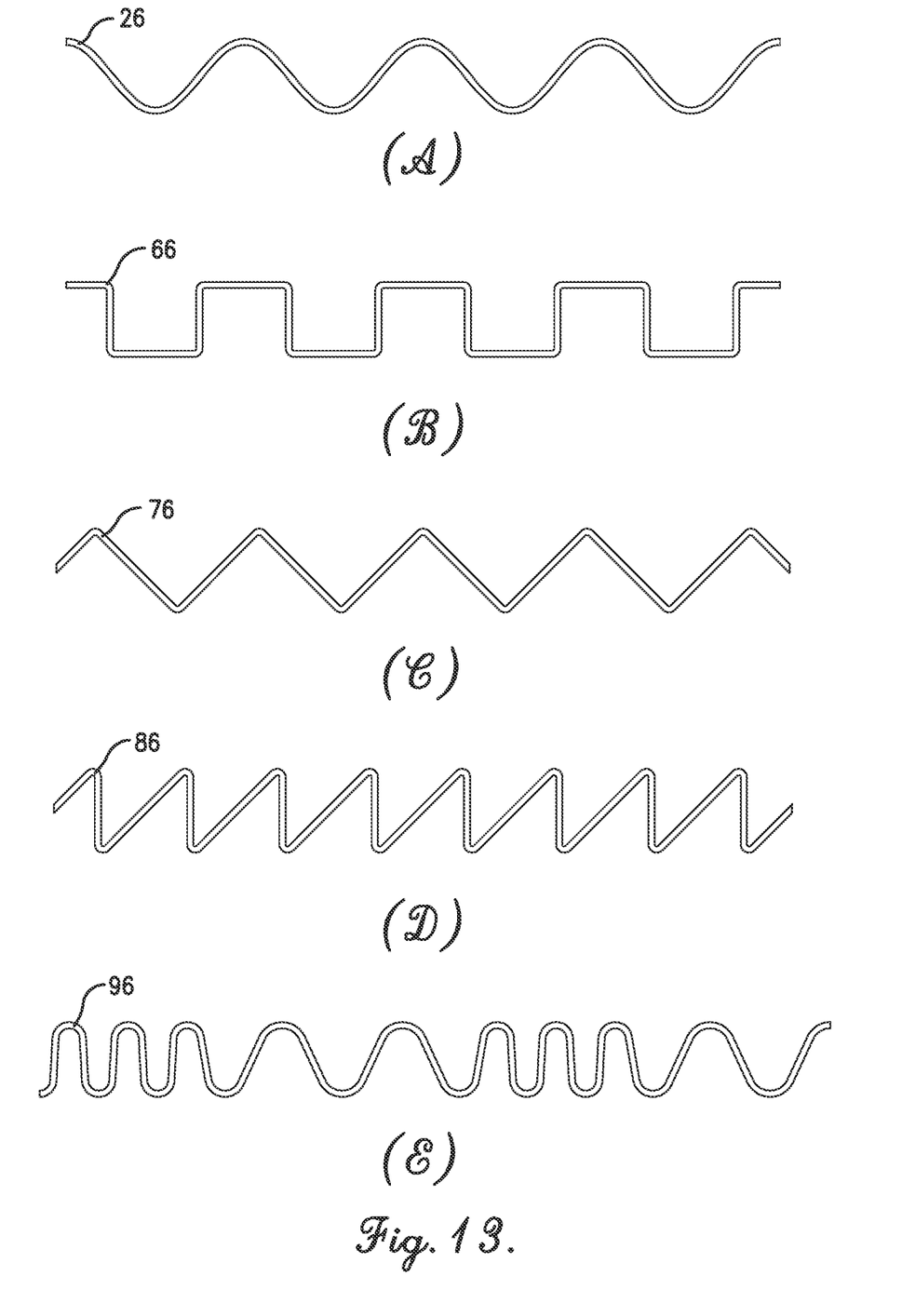
FIG. 13 shows various cross-sectional profiles of webs used in connection with a bulb stiffener according to embodiments of the invention.

Additionally, the frequency of the sine or other wave forming the profile of the web 26 may be altered to accommodate localized loading or otherwise without departing from the scope of the invention. For example, in applications where the bulb stiffener 22 is likely to encounter only relatively low side or shear loads, the frequency of the sine wave used to form the web 26 may be relatively low (i.e., the wavelength of the wave may be relatively long) thereby providing the increased lateral stiffness benefits of the invention albeit with relatively minor material cost and weight. Conversely, in applications where the bulb stiffener 22 is likely to encounter relatively high side or shear loads, the frequency of the sine wave used to form the web 26 may be relatively high (i.e., the wavelength of the wave may be relatively short), thereby providing increased resistance to shear stresses. And in some embodiments, the profile of the web 26 may be nonuniform (i.e., may follow no discernable pattern or mathematical function, may have an axially varying wavelength, etc.) as is schematically illustrated by the wave profile 96. In these embodiments, the wave profile 96 may be tailored to resist anticipated localized areas of high loading at certain axial positions corresponding to the increased frequency of the waves.

Moreover, although the embodiments and methods discussed herein referred to "ply" in the singular (e.g., the first ply 34, second ply 36, and base ply 38), the bulb stiffener 22 may include multiple plies at each portion for added stiffness or otherwise. More particularly, in some embodiments each of the first ply 34, the second ply 36, and the base ply 38 may include a ply stack having two or more plies of glass or carbon fiber fabric without departing from the scope of the invention.

Although the invention has been described with reference to the embodiments illustrated in the attached drawings, it is noted that equivalents may be employed without departing from the scope of the invention as recited in the claims.

What is claimed is:

1. A method for forming a bulb stiffener, the method comprising:
   providing a compression molding apparatus, the compression molding apparatus including a web forming portion having a non-linear profile in an axial direction;
   placing a plurality of plies within the compression molding apparatus, with a composite rod placed between at least some of the plurality of plies in the compression molding apparatus; and
   compressing the compression molding apparatus such that at least a portion of the plurality of plies are compressed in the web forming portion thereby forming a web of the bulb stiffener having a non-linear profile in the axial direction, wherein the step of compressing the compression molding apparatus further comprises compressing the plurality of plies about an outer perimeter of the composite rod, wherein the composite rod includes a truncated circular cross-sectional profile having a flat portion, and wherein the web extends along a lateral extent of the flat portion.

2. The method of claim 1, further comprising forming the web of the stringer having a sinusoidal profile in the axial direction.

3. The method of claim 1, wherein the composite rod is a pultruded rod comprised of zero-degree fibers, and wherein the step of placing the plurality of plies within the compression molding apparatus includes placing a plurality of plies having +/−45-degree fibers in the compression molding apparatus.

4. The method of claim 1, further comprising heating the plurality of plies prior to placing the plurality of plies within the compression molding apparatus.

5. The method of claim 1, further comprising:
   removing the plurality of plies from the compressing molding apparatus after the plurality of plies solidifies; and
   trimming a portion of the plurality of plies.

6. A method for forming a bulb stiffener, the method comprising:
   providing a compression molding apparatus, the compression molding apparatus including a web forming portion having a non-linear profile in an axial direction;
   placing a plurality of plies within the compression molding apparatus;
   placing a composite rod between at least two of the plurality of plies in the compression molding apparatus; and
   compressing the compression molding apparatus such that at least a portion of the plurality of plies are compressed in the web forming portion thereby forming a web of the bulb stiffener having a non-linear profile in the axial direction and at least a portion of the plurality of plies are compressed against the composite rod, wherein the composite rod includes a truncated circular cross-sectional profile having a flat portion perpendicular to the web, and wherein the web extends along a lateral extent of the flat portion.

7. The method of claim 6, further comprising forming the web of the stringer having a sinusoidal profile in the axial direction.

8. The method of claim 6, wherein the step of placing the composite rod in the compression molding apparatus includes placing a pultruded rod comprised of zero-degree fibers in the compression molding apparatus.

9. The method of claim 6, wherein the step of placing the plurality of plies within the compression molding apparatus includes placing a plurality of plies having +/−45-degree fibers in the compression molding apparatus.

10. The method of claim 6, further comprising heating the plurality of plies prior to placing the plurality of plies within the compression molding apparatus.

11. The method of claim 6, further comprising:
    removing the plurality of plies and the composite rod from the compressing molding apparatus after the plurality of plies solidifies; and
    trimming a portion of the plurality of plies.

* * * * *